R. EMERSON.
HARVESTER-RAKE.

No. 191,664. Patented June 5, 1877.

Attest
W. P. Baker
L. A. Bunting

Inventor
Richard Emerson
By
Attorneys

2 Sheets—Sheet 2.

R. EMERSON.
HARVESTER-RAKE.

No. 191,664. Patented June 5, 1877.

Attest
W. T. Baker
L. A. Bunting

Inventor
Richard Emerson
By _____
Attorneys

UNITED STATES PATENT OFFICE.

RICHARD EMERSON, OF SYCAMORE, ILLINOIS, ASSIGNOR OF ONE-HALF HIS RIGHT TO HORATIO H. MASON, OF SAME PLACE.

IMPROVEMENT IN HARVESTER-RAKES.

Specification forming part of Letters Patent No. 191,664, dated June 5, 1877; application filed November 6, 1876.

*To all whom it may concern:*

Be it known that I, RICHARD EMERSON, of Sycamore, in the county of De Kalb and State of Illinois, have invented a new and useful Improvement in Harvester-Rakes, which is fully described in the following specification, reference being had to the accompanying drawings, in which—

Figures 1, 2, 3:
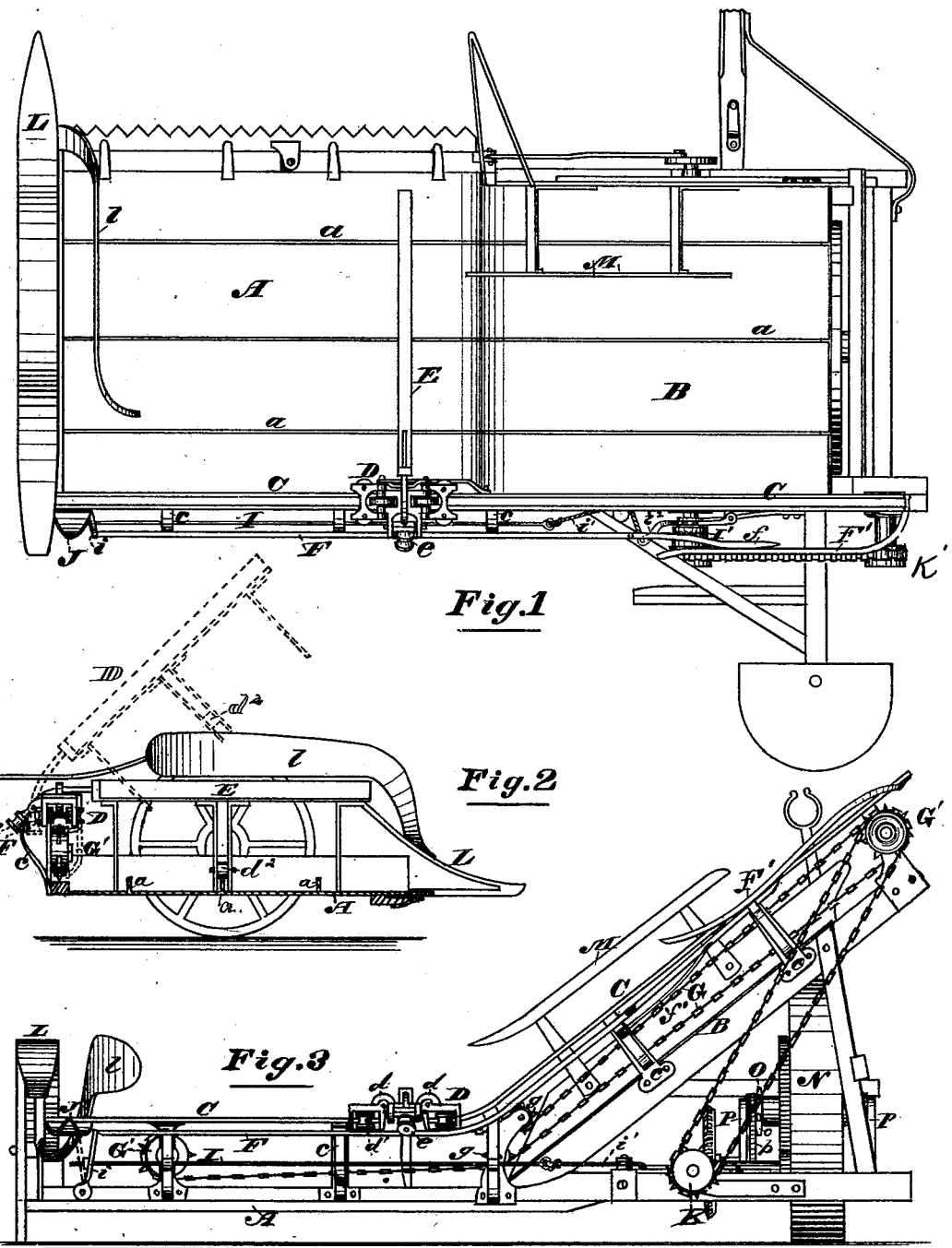
Figure 4:
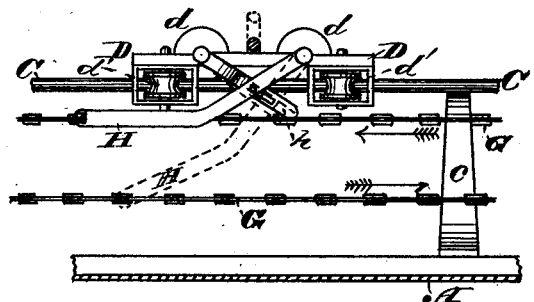
Figure 5:
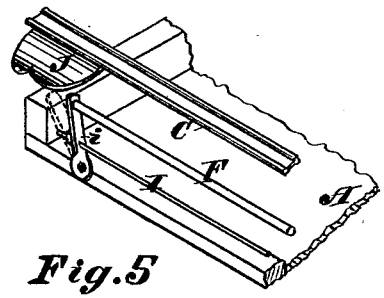
Figure 6:
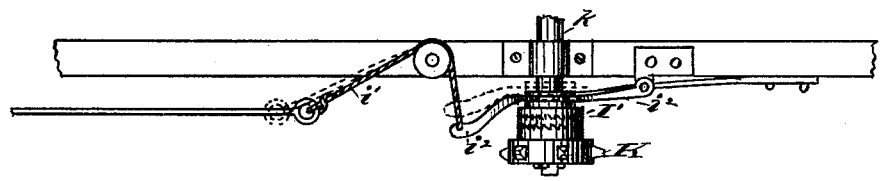
Figure 7:
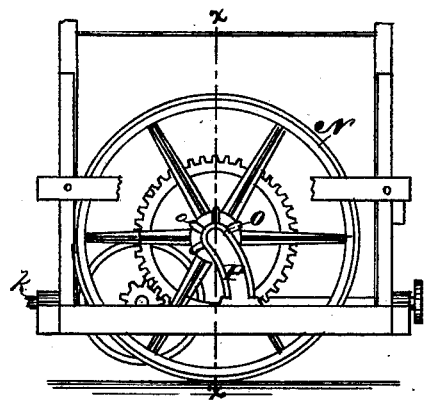
Figure 8:
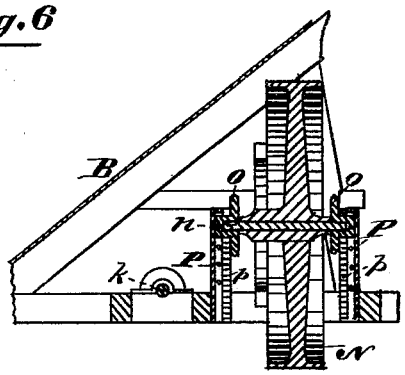
Figure 9:
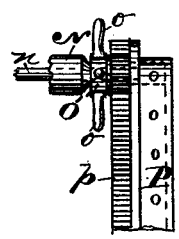

Figure 1 is a plan view of a harvesting-machine with my improvements attached; Fig. 2, an end elevation taken on the grain side of the machine; Fig. 3, a rear elevation of the machine shown in Fig. 1; Fig. 4, a detail view, on an enlarged scale, of the rake-carriage, guide-rail, and chain; Fig. 5, a detail view of the cam and clutch device at the outer end of the guide-rail; Fig. 6, a plan view of the clutch mechanism for throwing the rake mechanism into and out of gear; and Figs. 7, 8, and 9 detail views of the main supporting-wheel, and the devices for adjusting the main frame thereon.

My invention relates to harvesting-machines in which the rake traverses the platform at right angles to the line of movement of the machine, and then passes up an incline to elevate the grain, and discharge it into a suitable receptacle ready for binding either by hand or machine.

It consists in a divided grain guard or divider at the outer end of the platform to prevent the rake from becoming entangled with the falling grain. It also consists in a grain-guard attached to the front side of the elevator-frame, and extending part-way over said frame, under which the rake passes as it is carried up the incline, and above which it is carried when moving in the opposite direction; and it further consists in various combinations of devices, as will be hereinafter more fully set forth.

In the drawings, A represents the grain-platform of a harvester, on which the grain falls as it is cut, and B an inclined elevator-frame of ordinary construction. The platform A is provided with a series of longitudinal ribs, $a$, which also extend up the incline B. At the rear side of the platform and elevator-frame is a rail, C, constructed with a longitudinal depression along its center, and ribs along each edge, which is supported on posts $c$ fastened to the platform and elevator-frame, and bent so as to conform to the contour of the platform and elevator, as shown in Fig. 3 of the drawings. A carriage, D, is constructed to run upon this rail. The carriage is made in three parts, hinged together, to enable it to follow the bend in the rail, and is provided with rollers $d$ upon its top, and $d'$ at its sides, all of which rest upon the guide-rails, the latter being grooved to receive the edges of said rail.

A rake, E, is hinged to the rear side of this carriage, the rake-arm being extended slightly beyond the hinge to carry a grooved roller, $e$, which runs up on a guide-rod, F, in rear of and just below the rail C. One of the teeth is divided or forked, as shown in Fig. 2 of the drawings, for the purpose of embracing one of the ribs $a$ on the platform. This tooth also carries an anti-friction-roller, $d^2$, which is fitted to run along upon the top of the rib, and thus the rake is guided and held from dragging upon the platform as it passes over it and up the inclined elevator. The rake is driven back and forth by means of an endless chain, G, passing over suitable driving-wheels $G'$ and guide-wheels $g$. The rake-carriage is connected to this chain in a peculiar manner.

A long pitman, H, is connected by pivotal joints to both the carriage and chain. An arm, $h$, is also pivoted to the carriage on the opposite side of the rake-head, and is slotted near its other end. A pin on the pitman H enters this slot and connects the two together. By this device the reciprocal movement of the carriage is easily affected without binding on account of change in the leverage; for when it is drawn forward up the incline the pull is directly on the carriage through the pitman H, and when it is carried back in the opposite direction, in which case the point of connection between the pitman H and the chain G will be on the lower line of said chain, the pin on the pitman H will be pushed forward in the slot of $h$ to the end thereof, and the pull will again be directly on the carriage through the arm $h$, as shown in dotted lines in Fig. 4 of the drawings.

The guide-rod F is suitably supported by arms rigidly connected to any convenient portion of the frame-work of the machine. I have shown them attached to the rail-posts c.

The guide-rod extends only part-way up the inclined elevator, and to its outer end is pivoted a short switch-piece, f, which extends upward underneath a short rod, F', attached to the upper end of the rail C.

The switch-piece f is held out against the rod F' by means of a suitable spring, f', and its extreme outer end is beveled on its under side, as shown in Figs. 1 and 3 of the drawings.

The lower end of the rod F' is bent upward so that the rake-arm may pass under it in its upward motion, the switch f being pressed inward for this purpose. The lower end of the rod F does not extend quite to the end of the rail C, to the lower end of which is attached a curved cam, J, against which the rake-arm strikes on its return-movement, and thereby the rake is thrown down into working position again.

A rod, I, is supported below the guide-rod F loosely, so that it is free to slide back and forth, and its outer end is attached to a pivoted arm, i, located just at the lower end of the guide-rod F. The inner end of the rod I is connected by a cord or chain, $i^1$, to the end of a clutch-lever, $i^2$, which operates the spring-clutch I', which engages with the sprocket-wheel K loose on the shaft $k$, from which the rake is driven by means of the chain $i^1$ and sprocket-wheel K'. The rod I is adjustably connected to the pivoted arm i by means of a screw-thread on its outer end and a nut, so that its working length may be properly regulated to hold the arm i against the lower end of the rod F when the spring-clutch is engaged.

The outer divider or grain-guard L is divided, one branch, l, being curved inward and then extended to the rear, as shown in Figs. 1 and 2 of the drawings. The rear end of this piece is free and bent inward, and this device serves to guide the falling grain inward upon the platform, so that there is a free and clean space outside of the grain where the rake falls down between the two parts of the guard to a working position upon the platform at the end of its return-movement, and thus all tangling of the grain is prevented.

The rail C and guide-rod F' are extended some distance beyond the upper end of the inclined elevator-frame, so that the rake is carried beyond the point of delivery of the grain before its position is in the least changed, thus securing the perfect delivery of the gavel without tangling.

A grain-guard, M, is attached to the front side of the elevator-frame, and extends inward part-way over the incline, as shown in Fig. 1 of the drawings, to protect the gavel from displacement by the wind while being carried up the elevator by the rake. It is supported on bent arms at a sufficient distance above the incline to permit the rake to pass under it on its inward stroke, while it is tilted to pass over it in its downward movement.

The main wheel N is supported upon an axle, n, the ends of which are also loose in the pinions O. These pinions engage with segmental racks p on curved standards P, attached to the main frame of the machine.

The sleeves at the inner ends of the pinions O are provided with radial arms o, by means of which the pinions are turned to raise and lower the frame on the main axle, either by means of a wrench adapted to engage with the arms or spokes o, or by grasping the spokes directly, if they are made long enough for this purpose, and to give sufficient leverage. There are holes in the standards P, and through the outer ends of the pinions O, through which pins are passed to hold the pinions from turning, thereby preventing a change in the adjustment of the frame.

The operation of my raking mechanism is as follows:

The rake being in operative position at the outer end of the platform is carried across the latter and up the incline B by the devices above described, and is held from being thrown up by the roller e on the rear extension of the rake-arm, which passes along on the upper side of the guide-rod F, as shown in Figs. 1 and 2 of the drawings.

When the roller E reaches the lower end of the rod F' it passes under the latter, the switch f yielding inward to permit this, but closing immediately behind the roller after it is passed. In this forward movement of the rake the pitman H is in the position shown in full lines in Fig. 4 of the drawings, and the pull is directly upon it. The rake being carried forward, the gavel is discharged at the upper end of the incline, the rake being still carried forward so as to entirely clear the elevator before commencing its return stroke.

As the driving-chain passes around the sprocket-wheel at the upper end of the elevator the pitman-connection is carried around and below said wheel, and commences a movement backward down the incline. This carries the pitman H into the position shown in dotted lines in Fig. 4 of the drawings, and the pin is moved to the outer end of the slot in the arm h, so that the draft upon the carriage is through the latter. The rake is now drawn back, the roller e being underneath the rod F', which holds the rake from dropping down.

When the roller reaches the upper end of the switch f it is guided by the bevel thereon to the lower side of the switch-rod, by which movement it is tilted up into the position shown in dotted lines in Fig. 2 of the drawings, so as to clear the grain-guard M and the platform, as it is carried along on its return to the outer end of the platform. The roller e strikes against the arm i, and pushes it outward, so that just as the roller strikes the cam J, and is free from the lower end of the rod F, at which movement the rake begins to fall to the platform, the pull upon the rod I disengages the clutch I', and the rake stops an instant, so that while it falls there is no motion of the carriage, and thus the rake is permitted to pass down in the clear space behind the arm $l$ without tangling the grain, and effecting a clean separation of the grain upon the platform, as the space upon the latter upon which the rake falls is clear. At the instant the rake falls to the platform the spring-clutch is thrown into engagement again. The roller $e$ having left the arm $i$, the driving mechanism is put in motion again, and the operation of the rake described above is repeated.

The operation of the devices for adjusting the height of the main frame has been already set forth.

Having thus described my invention, what I claim as new, and desire to secure by Letters Patent, is—

1. The rake-carriage D, made in three parts, hinged together around the axes of the bearing-wheels $d\ d$, having the rake-arm hinged to the middle section, and the end sections provided with guide-wheels $d^1\ d^1$, for the purpose of enabling said carriage to traverse the rail C, and pass its curves smoothly.

2. The combination of the continuous rail C, formed with ribs along its edges and a depressed center, bent to conform to the contour of the grain platform and inclined elevator-frame, the jointed sectional rake-carriage D, provided with rollers $d\ d\ d^1\ d^1$, adapted to traverse said rail, as shown, and reciprocating upon the upper surface thereof, and the endless drive-chain G, substantially as and for the purpose set forth.

3. The combination of the rake-carriage D, pitman H, slotted arm $h$, and endless drive-chain G, substantially as and for the purpose set forth.

4. The rake-carriage D jointed, and rake E hinged thereto, and provided with a tail-stem and guide-roller, $e$, in combination with the rail C, extending along the platform and elevator, and guide-rod F', extending beyond the upper end of inclined elevator, whereby the rake may be carried in its forward movement beyond and clear from the elevator without dropping, substantially as and for the purpose set forth.

5. The combination of the carriage D, rake E hinged thereto, and provided with a rear extension of its arm, the rail C, guide-rods F and F', switch $f$, and endless chain G, substantially as and for the purpose set forth.

6. The rising and falling reciprocating rake in combination with the grain-guard M at the front side of the elevator-frame, and extending rearward, overhanging the incline, substantially as and for the purpose set forth.

7. The combination of the rear extension of the rake-arm, the sliding rod I, pivoted arm $i$, and spring-clutch I', connected to the sliding rod, substantially as and for the purpose set forth.

8. The divider or branching grain-guard L in combination with the reciprocating rising and falling rake, substantially as specified.

9. The combination of the platform having ribs $a$, rake E provided with a slotted or divided tooth, $d^1$, and roller $d^2$, substantially as set forth.

RICHARD EMERSON.

Witnesses:
SHUBAEL T. ARMSTRONG,
MAY L. ARMSTRONG.